United States Patent

Pasquier

Patent Number: 6,156,113
Date of Patent: Dec. 5, 2000

[54] BITUMINOUS BINDER, COMPOSITION AND USE

[75] Inventor: Michel Pasquier, Corbas, France

[73] Assignee: Societe Anonyme d'Application des Derives de l'Asphalte - S.A.A.D.A., Roussillon, France

[21] Appl. No.: 09/210,669

[22] Filed: Dec. 14, 1998

[51] Int. Cl.$^7$ .................................................. C09D 195/00
[52] U.S. Cl. ................................................................. 106/269
[58] Field of Search ............................................. 106/269

[56] References Cited

U.S. PATENT DOCUMENTS 2,877,129  3/1959  Hardman ............................ 106/279
3,366,500  1/1968  Kracauer ............................ 106/269

FOREIGN PATENT DOCUMENTS 597962  5/1960  Canada ............................... 106/269

*Primary Examiner*—David Brunsman
*Attorney, Agent, or Firm*—Pollock, Vande Sande & Amernick

[57] ABSTRACT

Use is made, as thinner or fluxing oil in an anhydrous or emulsified bituminous binder, of methyl esters of fatty acids which are obtained in particular by transesterification of vegetable oils. The hardening of the binder after spreading is obtained no longer by evaporation but by crosslinking of the thinner in the presence of atmospheric oxygen and of a catalyst.

18 Claims, 1 Drawing Sheet

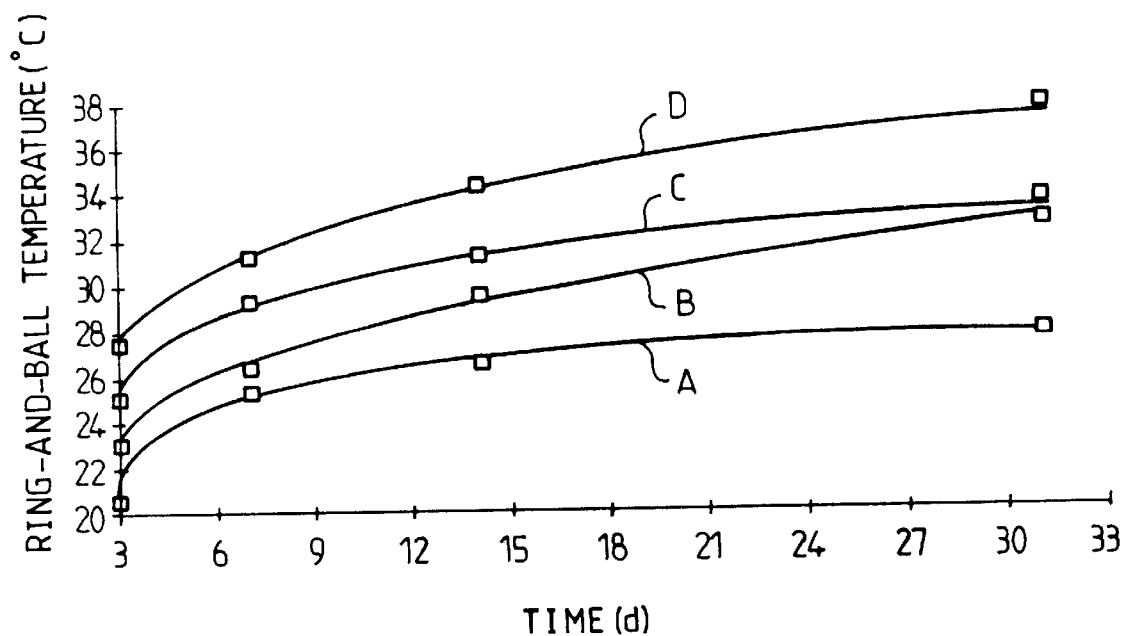

BITUMINOUS BINDER, COMPOSITION AND USE

Bituminous binders are used in particular in the road construction industry in order to provide the bonding between the aggregates or between the substrate and the aggregates. Various possibilities are distinguished in this respect:

- The bituminous binder is hot mixed with aggregates and the product is then described as hot bituminous mixes, the bituminous binder providing the bonding between the aggregates.
- The bituminous binder is hot spread over the substrate and then the aggregates are spread over this bituminous layer, which provides the adhesion to the substrate. The result is then described as anhydrous binder surfacings.
- The bituminous binder is cold mixed with the aggregates and the product is then described as cold bituminous mixes produced with an aqueous bituminous product emulsion.
- The bituminous binder is cold spread and the result is then described as surfacings produced with the aqueous bituminous binder emulsion.

When these mixes are prepared or these spreading operations are carried out, it is always necessary for the consistency of the binder to be such that it allows good wetting of the aggregates and for the consistency of the binder subsequently to change in order for the bituminous mixes or the surfacings thus produced to acquire mechanical performances which render them suitable for their road construction use.

A more fluid initial consistency of the binder is obtained either by heating the bituminous binder, or by thinning or fluxing (these two terms denote the same operation, the choice of one or other usually being a function of the nature of the additive), by introducing a solvent or fluxing oil of petroleum or carbon chemistry origin, or by aqueous emulsification of the bituminous binder, or by a combination of the above methods.

The invention more particularly relates to an improvement to the process by thinning or fluxing.

The solvents currently used are of petroleum or carbon chemistry origin. After the application of the binder, they evaporate in order to allow the latter to recover its high consistency. The solvents, thus gradually dispersed into the atmosphere, pollute the latter, contaminate aerobic organisms and contribute to the greenhouse effect. Furthermore, they generally comprise polycyclic aromatic compounds, at least some of which are recognized as mutagenic. The use of these solvents contributes to the exhaustion of fossil fuel resources.

The presence of the above mentioned solvents also poses safety problems, because they greatly lower the ignition point and require strict measures for protection against fire on storage and during transportation.

The aim of the invention is to overcome all or part of the above disadvantages, without affecting the road construction performance of the bituminous binder or its conditions of use.

The invention is targeted in particular at a bituminous binder for road construction comprising bitumen and a thinner and provides for the thinner to comprise at least one fatty acid monoester capable of being chemically converted on contact with the air, after the binder has been spread, in order to increase the viscosity of the latter.

The term monoester denotes esters in which the molecule comprises a single —CO—O— group, in contrast in particular to the constituent triglycerides of fats, which are triesters of fatty acids.

Fatty acid monoesters are neither toxic nor harmful to the environment and have an ignition point of the order of 200° C., instead of 50 to 85° C. approximately for petroleum or carbon chemistry thinners or fluxing oils. They can be obtained by transesterification from vegetable oils, which are renewable products, so that their use does not contribute to the increase in atmospheric $CO_2$ and to the greenhouse effect. On the contrary, the incorporation in the road of products derived from plants, which consume carbon dioxide gas in photosynthesis, contributes to the decrease in this gas.

Vegetable oils result from the grinding up of various kinds of grains. Chemically, they are in the form of triglycerides, that is to say of triesters resulting from the condensation of three molecules of fatty acid and of one molecule of glycerol. The fatty acids can comprise a variable number of carbon-carbon double bonds depending on the plant from which the oil originates. The fatty acids and the corresponding esters have a reducing power which is a function of the number of double bonds and of the closeness of the latter in the hydrocarbon chain. This reducing power is measured by the iodine number and is expressed by a polymerization under the action of oxygen, which causes thickening and hardening. This phenomenon is known under the name of drying. The polymerization can be catalyzed by metal salts, in particular organic salts of cobalt, manganese and zirconium.

Whereas triglycerides, in particular in the form of vegetable oils, do not make it possible to suitably thin bituminous binders, this result is obtained by using monoesters, in particular methyl monoesters, which can be obtained by transesterification from these oils.

The methyl esters resulting from the transesterification of vegetable oils by means of methyl alcohol are known products which were originally developed as substitutes for gas oil.

The monoesters used in the invention can also be obtained from animal oils or from other sources.

It is found that monoesters of fatty acids are good solvents for bitumen, even under cold conditions, and that their low viscosity confers on them a fluxing power equivalent or even superior to that of the fluxing oils of petroleum origin currently used.

On the other hand, these esters are not volatile, their initial distillation temperature being greater than 300° C. They exhibit excellent biodegradability.

In the absence of evaporation of solvents, the increase in consistency of the binder after spreading involves chemical reactions in the presence of atmospheric oxygen. These reactions, catalyzed in a known way by metal salts, comprise the formation of peroxide bridges —O—O— on the unsaturated chains of the fatty acids. These bridges are unstable and result in the formation of free radicals, which attack other chains, producing, by propagation, a polymerization-crosslinking of the esters.

Optional characteristics of the invention, which may be complementary or alternative, are set out below:

- The thinner comprises at least one monoester of a fatty acid and of an alcohol comprising at most 4 carbon atoms.
- The said monoester or monoesters, or the oil from which they arise, have an iodine number of greater than or equal to 120. The iodine number makes it possible to classify the reactivity of the oils and of their esters with respect to atmospheric oxygen and to evaluate their ability to harden and to form films. It represents the mass of iodine in grams which can be fixed by 100 grams of oil.

The binder additionally comprises at least one catalyst of the polymerization of the thinner under the action of oxygen, such as a cobalt, manganese or zirconium octoate or naphthenate.

The binder comprises, as catalyst, a mixture of at least two different metal salts.

The binder is in the form of an emulsion composed of a bituminous phase and of an aqueous phase, the thinner, and the catalyst if any, being present in the bituminous phase.

The characteristics and advantages of the invention will be explained in more detail in the description given below of some implementational examples, with reference to the appended drawing, in which the single FIGURE reproduces curves showing the change over time of the consistency of a known binder and of a binder according to the invention.

All the binders described in the examples below are prepared from bitumens originating from the Lavéra refinery of the Company BP.

The percentages are given by mass.

EXAMPLE 1

A reference binder 1, commonly used to produce surfacings, is prepared, which binder has the following composition:

bitumen 180/220 91%

BP-Flux 9%.

BP-Flux is the trade name of a fluxing oil sold by the company BP, which oil is a mixture of polynuclear aromatic solvents obtained as by-product of refinery cracking.

A binder 1 is also prepared which has the following composition, which composition is chosen so that the binder exhibits, like the reference binder, an initial viscosity of approximately 110 s, measured at 40° C. according to NF Standard T66-005:

bitumen 180/220 91% rapeseed methyl ester 8.82% cobalt octoate 0.18%.

The expression "rapeseed methyl ester" denotes a mixture of methyl esters obtained by transesterification of rapeseed oil with methanol.

BRIEF DESCRIPTION OF THE DRAWING

Samples of these two binders were spread as 1 mm layers and were stored at a temperature of 10 or 20° C. The ring-and-ball softening point was measured according to French Standard NF T66-008, for each layer, after 3, 7, 14 and 31 days. The results are given in Table 1 and in the FIGURE, where the curves A, B, C and D correspond respectively to the binder 1 at 10° C., to the binder 1 at 20° C., to the reference binder 1 at 10° C. and to the reference binder 1 at 20° C.

TABLE 1

| Temperature | Time | Ring-and-ball (° C.) | |
|---|---|---|---|
| (° C.) | (d) | Reference 1 | Binder 1 |
| 10 | 3 | 25.1 | 20.55 |
| 10 | 7 | 29.3 | 25.35 |
| 10 | 14 | 31.25 | 26.55 |

TABLE 1-continued

| Temperature | Time | Ring-and-ball (° C.) | |
|---|---|---|---|
| (° C.) | (d) | Reference 1 | Binder 1 |
| 10 | 31 | 33.3 | 27.65 |
| 20 | 3 | 27.45 | 23.05 |
| 20 | 7 | 31.25 | 26.35 |
| 20 | 14 | 34.3 | 29.5 |
| 20 | 31 | 37.5 | 32.55 |

Although rapeseed oil has a relatively low iodine number of less than or equal to 120 and is not classed among drying oils, the use as thinner of the methyl esters which derive therefrom results in a change in the consistency to a value comparable comparable to that of a conventional binder.

EXAMPLES 2 TO 4

Binders 2 to 4 having the following general composition:

bitumen 70/100 91% methyl ester 8.8% cobalt octoate 0.2% are prepared by using methyl esters derived from different vegetable oils having different iodine numbers, namely:

binder 2: sunflower oil, iodine number approximately 120;

binder 3: linseed oil, iodine number approximately 180;

binder 4: isomerized sunflower oil, iodine number approximately 140.

The effect of the isomerization treatment is to increase the number of adjacent double bonds and consequently the iodine number.

Although the above examples use a single metal salt as catalyst, it can be advantageous to combine salts of different metals chosen in particular from cobalt, manganese, zirconium and calcium, so as to make possible drying to the core, avoiding a skin effect.

EXAMPLE 5

A binder in the form of a bituminous emulsion is prepared by mixing a bituminous phase and an aqueous phase.

Emulsions of bitumens, which emulsions are optionally modified and/or fluxed, are used for surface dressings. Emulsion techniques allow, to a certain extent, freedom from weather restrictions and allow the periods during the year in which the dressing can be applied to be extended (essentially in the spring and in the autumn). In this case, the fluxing introduces a low initial consistency which facilitates the placing of the aggregates during the production of the dressing (placing of the "mosaic").

Here again, according to the invention, use is made, to this end, of methyl esters of vegetable oils, a drying catalyst being chosen which is insensitive to hydrolysis during the formulation of the emulsion, in particular cobalt octoate. The health and ecological advantages mentioned above are then combined with the advantages of a cold technique, namely low energy consumption and better safety during implementation by virtue of the absence of high temperatures.

In the example, the bituminous phase of the emulsion has the following composition by weight, calculated with respect to the total mass of the emulsion:

bitumen 57.9% sunflower methyl ester 2% cobalt octoate with 6% Co 0.1%.

The composition of the aqueous phase is as follows:

Emulsamine L60 0.2%

37% hydrochloric acid 0.2% water 39.6%.

Emulsamine L60 is the trade name of an emulsifier supplied by the Company CECA.

These two phases are brought respectively to 145° C. and to 35° C. and mixed in a colloid mill in order to obtain an emulsion.

Measurements of the ring-and-ball softening point were carried out according to French Standard NF T66-008 on samples of the binders 1 to 5, in comparison with a reference binder 2 having the following composition:

bitumen 70/100 91%

BP-Flux 9%.

1 mm layers of the various samples were exposed together to the outside world and in the open air, in summer and while shaded from the sun, which represents conditions close to reality. The emulsion of the binder 5 had been broken beforehand by evaporation for a few hours in the laboratory.

The results as a function of time are given in Table 2.

TABLE 2

| Time (d) | Ring-and-ball (° C.) | | | | |
|---|---|---|---|---|---|
| | Reference 2 | Binder 2 | Binder 3 | Binder 4 | Binder 5 |
| 7 | 30.4 | 27.9 | 28.5 | 28.2 | 29.1 |
| 14 | 37.2 | 32.3 | 36.4 | 34.0 | 37.2 |
| 28 | 39.9 | 35.2 | 35.7 | 35.2 | 41.5 |

These results show, for all the examples, kinetics which are very similar to those of the reference and which are entirely acceptable on work sites.

EXAMPLE 6

This example relates to a binder intended for the coating of aggregates.

The composition of the binder is as follows:

bitumen 86.7% sunflower methyl ester 12% cobalt naphthenate with 6% Co 0.5% zirconium octoate with 18% Zr 0.8%.

This binder makes possible the coating of dense or open formulae, the aggregates being preheated to approximately 100° C. The bituminous mix obtained can be stored for some time.

Coating by emulsified binders is also possible.

It is found that the bituminous emulsions according to the invention are much finer and give better wetting of the aggregates than known bituminous emulsions. This is due to the highly polar nature of the monoesters of fatty acids, which promotes emulsification.

What is claimed is:

1. A bituminous binder for road construction comprising bitumen and a thinner, wherein the thinner comprises at least one fatty acid monoester of a fatty acid and of an alcohol comprising at most 4 carbon atoms and being capable of being chemically converted on contact with the air, after the binder has been spread, in order to increase the viscosity of the latter, and additionally comprising at least one catalyst for the polymerization of the thinner under the action of oxygen.

2. The binder as claimed in claim 1, wherein the thinner comprises at least one fatty acid methyl monoester.

3. The binder as claimed in claim 2, wherein the thinner comprises a mixture of mono-esters of fatty acids which is obtained by transesterification of an animal or vegetable oil.

4. The binder as claimed in claim 2, wherein the said monoester or monoesters, have an iodine number of greater than or equal to 120.

5. The binder as claimed in claim 2, additionally comprising at least one catalyst of the polymerization of the thinner under the action of oxygen.

6. The binder as claimed in claim 2, in the form of an emulsion composed of a bituminous phase and of an aqueous phase, the thinner, and the catalyst being present in the bituminous phase.

7. The binder as claimed in claim 1, wherein the thinner comprises a mixture of mono-esters of fatty acids which is obtained by transesterification of an animal or vegetable oil.

8. The binder as claimed in claim 7, wherein the said monoester or monoesters, or the said oil, have an iodine number of greater than or equal to 120.

9. The binder as claimed in claim 7, in the form of an emulsion composed of a bituminous phase and of an aqueous phase, the thinner, and the catalyst being present in the bituminous phase.

10. The binder as claimed in claim 1, wherein the said monoester or monoesters, have an iodine number of greater than or equal to 120.

11. The binder as claimed in claim 10, additionally comprising at least one catalyst of the polymerization of the thinner under the action of oxygen.

12. The binder as claimed in claim 10, in the form of an emulsion composed of a bituminous phase and of an aqueous phase, the thinner, and the catalyst being present in the bituminous phase.

13. The binder as claimed in claim 1, comprising, as catalyst, a mixture of at least two different metal salts.

14. The binder as claimed in claim 13, in the form of an emulsion composed of a bituminous phase and of an aqueous phase, the thinner, and the catalyst being present in the bituminous phase.

15. The binder as claimed in claim 1, in the form of an emulsion composed of a bituminous phase and of an aqueous phase, the thinner, and the catalyst being present in the bituminous phase.

16. The binder as claimed in claim 15 wherein the thinner comprises a mixture of monoesters of fatty acids which is obtained by transesterification of an animal or vegetable oil, said monoester or monoesters, or the said oil having an iodine number greater than or equal to 120, and wherein said catalyst comprises a mixture of at least two different metal salts.

17. The binder as claimed in claim 1, wherein the thinner comprises a mixture of mono-esters of fatty acids which is obtained by transesterification of an animal or vegetable oil.

18. The binder as claimed in claim 1, wherein the said monoester or monoesters, have an iodine number of greater than or equal to 120.

* * * * *